March 29, 1932. H. REIFSCHNEIDER 1,851,064
ADJUSTABLE LAND LEVELER AND FLOATER
Filed Feb. 13, 1931
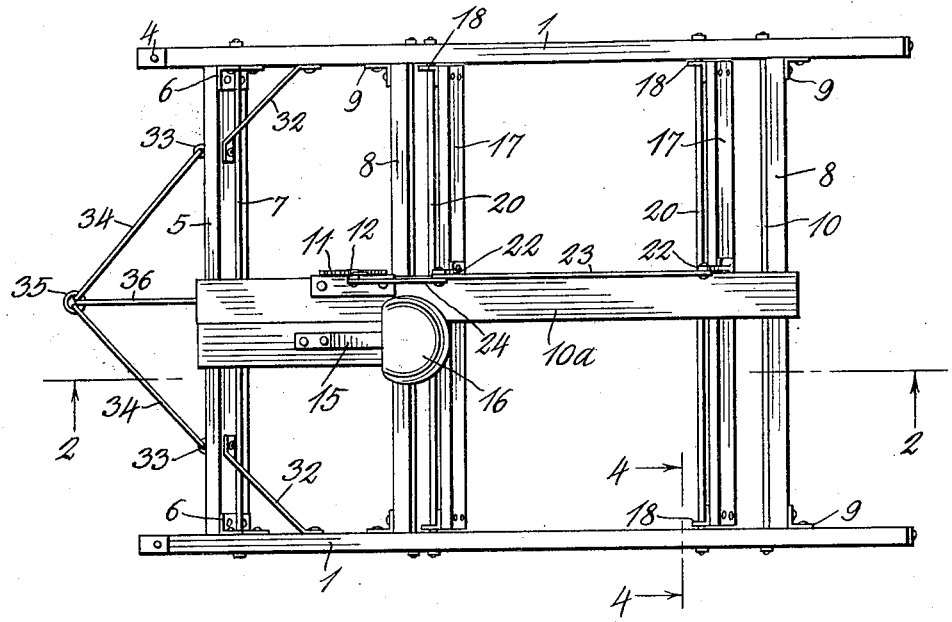
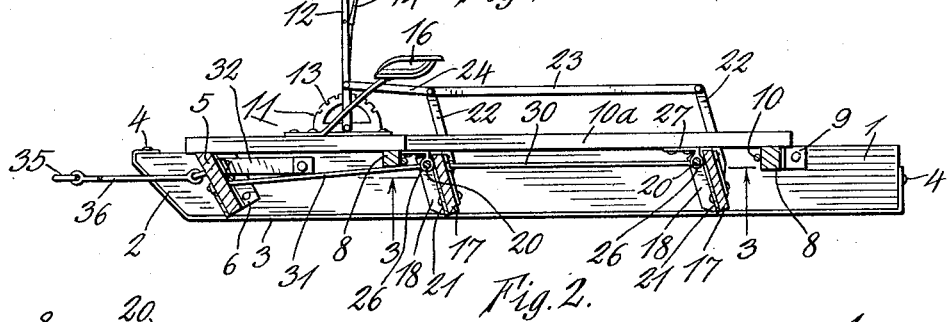
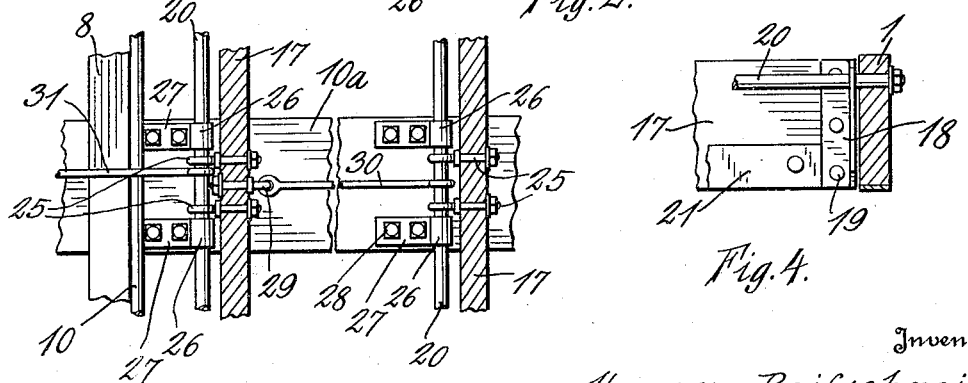
Inventor
Henry Reifschneider
By
Attorney Patented Mar. 29, 1932

1,851,064

UNITED STATES PATENT OFFICE

HENRY REIFSCHNEIDER, OF SEVERANCE, COLORADO

ADJUSTABLE LAND LEVELER AND FLOATER

Application filed February 13, 1931. Serial No. 515,472.

This invention relates to improvements in devices for leveling fields and roads and for similar purposes.

In parts of the country where irrigation is practiced it is quite necessary that the ground should be as level as possible as this facilitates the distribution of water. For the purpose of leveling the surface of the ground many different devices have been tried, none of which, however, appears to meet all the requirements necessary for successful operation.

It is the object of this invention to produce a device of the type referred to that shall be especially well adapted for leveling the surface of the ground and which can therefore be used for leveling fields and for preparing golf links, flying fields and for similar purposes.

This invention, briefly described, consists of two spaced substantially parallel runners that resemble the runners of sleds and whose front ends are separated by a spacing bar. Located between the runners and to the rear of the spacing bar are two or more float boards, that are pivotally attached to the runners in such a way that they can be tilted about axes that extend parallel with the longitudinal axes of the float boards. Means is provided for tilting the float boards and for holding them in tilted position. Means is also provided for interconnecting the center portions of the float boards with each other and with the spacing bar so as to prevent the rearward bending of the float boards when the device is in operation.

Having thus briefly described the invention the same will now be described in detail and for this purpose reference will be had to the accompanying drawings in which the preferred embodiment of the invention has been illustrated, and in which:

Fig. 1 is a top plan view of the device;

Fig. 2 is a section taken on line 2—2, Fig. 1;

Fig. 3 is a section taken on line 3—3, Fig. 2; and

Fig. 4 is a section taken on line 4—4, Fig. 1.

In the drawings reference numeral 1 represents the two runners. These runners have their front ends upwardly and forwardly inclined as indicated by reference numeral 2 and are provided with steel shoes 3 that are held in place by suitable means such as screws 4. Extending between the front ends of the runners is a spacing bar 5. This spacing bar is preferably downwardly and rearwardly inclined as shown in Fig. 2 and is provided at its ends with angle iron brackets 6 that are secured to the inner surfaces of the runners by bolts or screws in the manner shown. A rod 7 extends through the runners and through openings in the flanges of brackets 6 and serves to hold the runners tightly against the ends of the spacing bar.

Located to the rear of the bar 5 are two or more square spacing bars 8 that are secured in place by means of brackets 9 and rods 10 in a maner similar to that described in connection with bar 5. A plank 10a is supported on the upper edges of bars 5 and 8 and this plank has secured to it a quadrant 11 to which a handle 12 is attached. The quadrant is provided with spaced notches 13 that are engaged by a pawl slidably connected with the handle and which is operated by the rotation of a small lever 14 in the usual manner. Located adjacent the plank and extending from the spacer bar 5 to the foremost spacer bar 8 is another short plank to which the seat spring 15 is secured. A seat 16 is attached to the upper end of this spring. Located between the two spacer bars 8 are float boards 17. The ends of these float boards are provided with angle iron brackets 18 that are secured to the boards by means of bolts or rivets 19. The flanges of the brackets are provided with openings for the reception of rods 20 that extend through openings in the runners 1 and which serve as pivots about which the float boards can be tilted. The lower front surface of each float board has attached to it a steel plate 21 that prevents excessive wear of the boards. Secured to the rear surfaces of the float boards are levers 22 that extend upwardly some distance above the upper surface of the plank and whose upper ends are connected by a rod 23. The front end of rod 23 is connected with the handle 12 by means of a link 24.

Referring now more particularly to Fig.

3, it will be seen that the rods 20 are secured to the center portions of the float boards by means of eyebolts 25, of which there are two for each float board. These bolts enclose the rods 20 and hold them anchored to the board in a manner quite apparent from the drawings. Located on the outside of each eyebolt is a bearing 26. These bearings are provided with laterally extending portions 27 that are perforated for the reception of the anchoring bolts 28. The front float board is also provided with an eyebolt 29 that is located between the two eye bolts 25 and has its eye at the rear of the board. A rod 30 connects the eye bolt 29 with the rod 20 that is associated with the rear float board. A rod 31 connects the rod 20 that is associated with the foremost float board with the spacer bar 5.

Extending between the spacer bar 5 and the runners 1 are diagonal braces 32 that serve to hold the parts rigidly assembled. Eye bolts 33 extend through the spacer bar 5 and through the ends of braces 32 in the manner shown in Fig. 1. Draw bars 34 extend from the eye bolts 31 to a ring 35 and are connected with the latter. Link 36 extends from ring 35 to the center of the spacer bar 5 as shown in the drawings. The horses or the tractor are hitched to the ring 35 and the tractive force is transmitted to the device through the three links and is therefore distributed equally in a transverse direction. The float boards can be tilted by means of the lever 12 in a manner quite apparent from the drawings.

With the parts assembled in the manner shown, we will now assume that the device is to be used for leveling a field. The field is first plowed and harrowed, after which this leveling device is drawn over the field by means of horses or by a tractor. The device is supported by the runners and by properly inclining or tilting the float bars any elevations in the ground surface will be scraped along and deposited in depressions with the result that the surface of the field will become level. The inclined spacer bar 5 also serves to crush any lumps that may be present. The device is drawn back and forth over the field until the surface has been leveled to the extent desired.

From the above it will be apparent that the device that has been shown and described is of a simple and substantial construction and is especially well adapted for use in leveling ground for any purpose whatsoever. The adjustable float boards make it possible to get better results than if stationary floats were employed because it is often necessary to be able to adjust these members in accordance with the condition of the ground that is operated upon. I also wish to call attention to the manner in which the float boards are pivoted and the manner in which they are interconnected with each other and with the spacer bar 5.

The embodiment of the invention that has been shown and described is the preferred construction but it is to be understood that the invention is not to be limited to the exact construction shown to any greater extent than is necessary due to the state of the prior art and applicant therefore contemplates making such changes as he may find to be necessary, and which do not depart from the invention shown.

Having described the invention what is claimed as new is:

1. An apparatus of the class described, comprising, in combination, two spaced parallel runners, a spacer bar extending between the forward ends of the runners, a pair of float boards extending between the runners at the rear of the spacer, said boards being mounted so as to be tiltable about axes that extend parallel with the length of the boards, means for simultaneously tilting the boards and for holding them in tilted position and means for interconnecting the center portions of the float boards and the center portion of the spacer bar.

2. An apparatus of the class described comprising, in combination, two spaced parallel runners, a spacer bar extending between the front ends of the runners, means for securing the ends of the spacer bar to the runners, means for bracing the corners between the spacer bar and the runners, a plurality of float boards located between the runners and located at the rear of the spacer bar, each float board having an angle bracket at each end, a rod extending through both of the runners and through the brackets, said rods serving as pivots about which the boards are tilted, means for interconnecting the centers of the float boards with each other and with the center portion of the spacer bar, and means for simultaneously tilting the boards and holding them in tilted position.

In testimony whereof I affix my signature.

HENRY REIFSCHNEIDER.